United States Patent [19]
Levine et al.

[11] Patent Number: 5,765,467
[45] Date of Patent: Jun. 16, 1998

[54] BEVERAGE BREWING APPARATUS

[76] Inventors: Harvey Levine, 255 Woodside Cir., Fairfield, Conn. 06432; Lawrence T. Levine, 3 Austin Dr. Extension, Easton, Conn. 06612

[21] Appl. No.: 714,229

[22] Filed: Sep. 16, 1996

Related U.S. Application Data

[60] Provisional application No. 60/003,803, Sep. 15, 1995.

[51] Int. Cl.$^6$ ................................................ A47J 31/00
[52] U.S. Cl. ............................ 99/282; 99/283; 99/304
[58] Field of Search .......................... 99/283, 282, 304

[56] References Cited

U.S. PATENT DOCUMENTS

| | | | |
|---|---|---|---|
| 2,725,008 | 11/1955 | Okie | 99/283 |
| 2,829,583 | 4/1958 | Leonard | 99/282 |
| 3,011,427 | 12/1961 | Okie | 99/283 |
| 3,333,527 | 8/1967 | Bender | 99/283 |
| 3,333,528 | 8/1967 | Bender | |
| 3,442,199 | 5/1969 | McGrail | 99/283 |
| 3,451,330 | 6/1969 | Bender | 99/299 |
| 4,762,055 | 8/1988 | Shimomura | 99/285 |
| 4,798,222 | 1/1989 | Kauffman | 99/279 X |
| 4,805,523 | 2/1989 | Stuckey et al. | 99/281 |
| 4,876,953 | 10/1989 | Imamura et al. | 99/280 |
| 4,944,217 | 7/1990 | Watanabe | 99/280 |
| 4,969,392 | 11/1990 | Steele et al. | 99/282 |
| 4,997,015 | 3/1991 | Johnson | 99/299 X |
| 5,085,135 | 2/1992 | Collignon | 99/299 |
| 5,159,873 | 11/1992 | Weeden | 99/279 |
| 5,165,327 | 11/1992 | Ferrara, Jr. | 99/307 |
| 5,259,295 | 11/1993 | Timm | 99/282 |
| 5,267,506 | 12/1993 | Cai | 99/280 |
| 5,357,848 | 10/1994 | Eugster et al. | 99/279 |
| 5,388,501 | 2/1995 | Hazan et al. | 99/285 |
| 5,415,080 | 5/1995 | Charles et al. | 99/299 |

*Primary Examiner*—Reginald L. Alexander
*Attorney, Agent, or Firm*—Patrick J. Walsh

[57] ABSTRACT

A beverage brewing apparatus is disclosed which includes a housing having a base for supporting a carafe with a brewing basket and a body defining a water reservoir, a brewing assembly including a heating chamber communicating with the water reservoir and a heating element in thermal contact with said heating chamber, and a dispensing assembly including a valve member supported adjacent an outlet port of the heating chamber, a thermally responsive actuating member disposed within the heating chamber and connected to the valve member for moving the valve member from a closed position to an open position when water contained within the heating chamber is heated to a predetermined temperature.

24 Claims, 4 Drawing Sheets

FIG. 1

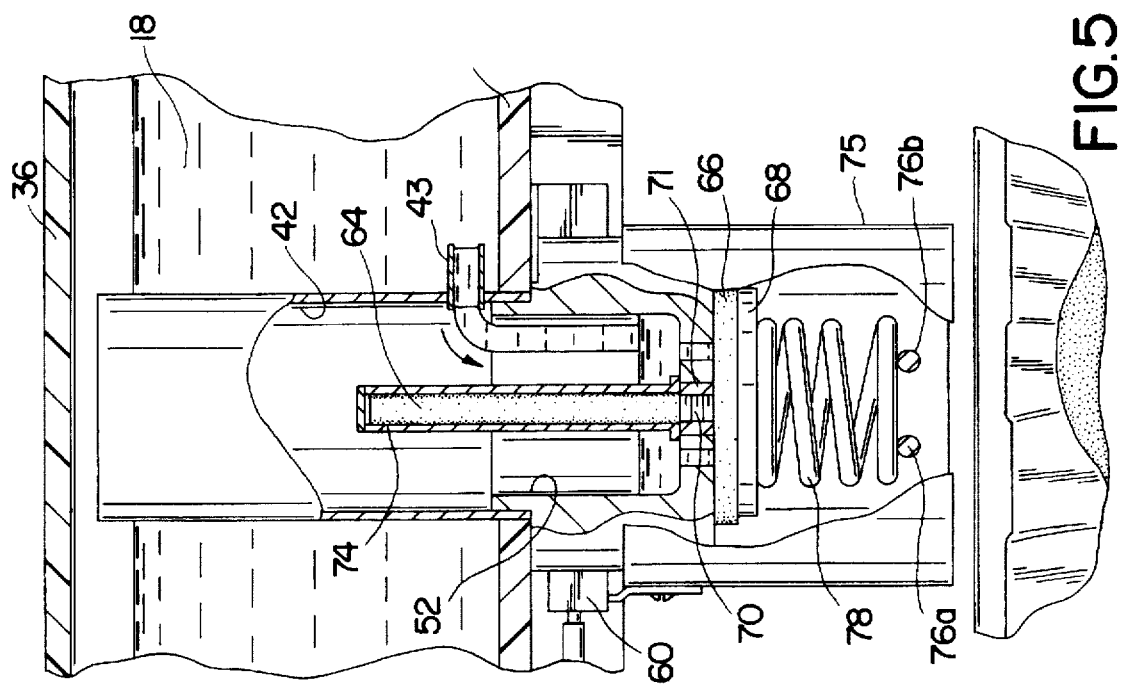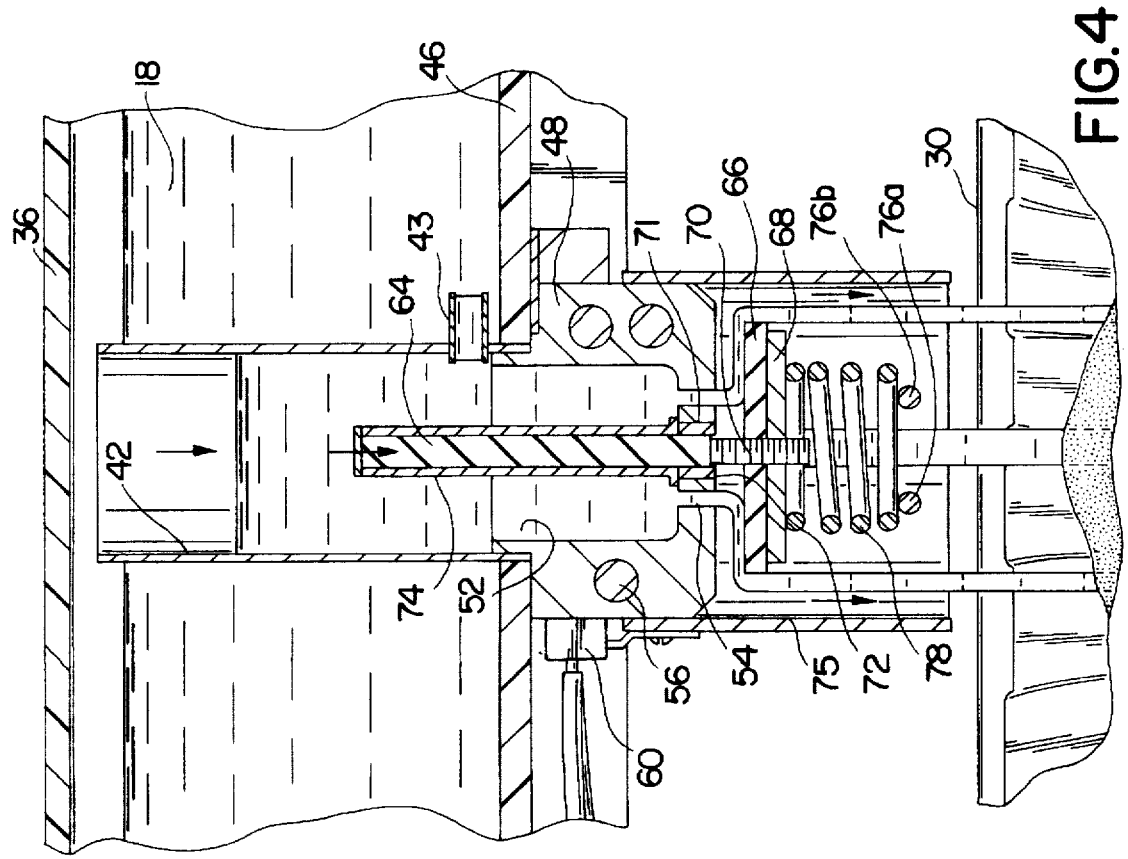

BEVERAGE BREWING APPARATUS

CROSS-REFERENCE TO RELATED APPLICATIONS

This application claims priority to Provisional application Ser. No. 60/003,803 filed Sep. 15, 1995.

BACKGROUND OF THE INVENTION

1. Field of the Invention

The subject invention is related to a beverage brewing apparatus, and more particularly, to an automatic drip coffee maker having a unique valve assembly for dispensing heated water into a brewing basket containing coffee grounds.

2. Background of the Related Art

Single pass drip coffee making appliances are well known in the art. Early examples of such appliances are disclosed in U.S. Pat. Nos. 3,333,528 and 3,451,330 to Bender. In general, both of these early drip coffee makers included a valve member in the form of a manually removable rod or stopper which controlled the flow of heated water through a discharge orifice defined the bottom of a hot water reservoir. The necessity to manually remove the valve member at a particular time during the brewing cycle made coffee making somewhat unpredictable.

In later years, automated drip coffee makers were designed to provide a more uniform flow of heated water into a brewing basket. These appliances included a cold water reservoir having a bimetal valve disposed in the bottom thereof, and a water heating chamber having a heater associated therewith. When the heater was activated to increase the temperature of the heating chamber, the valve distorted to allow water to pass from the cold water reservoir into the heating chamber. When a sufficient amount of hot water was present in the heating chamber, it overflowed into a brewing basket located therebelow.

A more recent version of an automatic drip coffee maker designed to provide a substantially even flow of heated water through a valve into a brewing basket is disclosed in U.S. Pat. No. 4,969,392 to Steele et al. This device includes a water reservoir having a valve disposed at the bottom thereof which opens when the water therein reaches a predetermined temperature. The valve includes a body having an aperture therein and a deformable bladder which is movable between open and closed positions to control the flow of water through the aperture. The deformable bladder has a domed top which tends to flatten under the pressure of water, so as to push the outer edge of the bladder against the side wall of the aperture, thereby providing an effective seal. An actuator rod, which is coupled by a plunger to a thermostatically controlled solenoid, is connected to the side wall of the bladder to effectuate movement of the bladder from a closed position to an open when the water contained within the reservoir reaches a predetermined temperature sensed by a thermostat.

Although the coffee maker disclosed by Steele et al. is useful to provide a controlled even flow of heated water to a brewing basket, the valve assembly thereof includes several expensive mechanical components, such as the deformable bladder, the bimetal thermostat, and the solenoid, which all have moving parts that are susceptible to fatigue failure over time. In addition, in the Steele et al. device, the entire quantity of water in the reservoir must be heated over a period of time to a particular temperature before it is dispensed. This requires the use of a metallic reservoir, as well as a high wattage heating element.

It would be beneficial therefore, to provide an improved automatic drip coffee maker having a dispensing assembly which includes an inexpensive temperature responsive valve mechanism having few, if any, mechanical components susceptible to fatigue failure, and which, instead, relies upon the inherent material properties of the valve mechanism itself. It would also be beneficial to provide an automatic drip coffee maker which utilizes a low wattage water heater to incrementally heat small quantities of water within a metallic heating chamber into which water is feed from a cool water reservoir over a period of time.

SUMMARY OF THE INVENTION

The subject invention is directed to a unique beverage brewing apparatus, and more particularly, to an improved automatic drip coffee maker having an extremely reliable and highly efficient water dispensing system associated therewith. The apparatus comprises a housing having a lower base portion for supporting a carafe and an associated brewing basket, and an upper body portion defining a water reservoir dimensioned to contain a quantity of water for brewing. A brewing assembly is operatively associated with the upper body portion and it includes a heating chamber having an inlet port communicating with the water reservoir and an outlet port through which heated water is dispensed into the brewing basket, and a low wattage electrically powered heating element disposed in thermal contact with the heating chamber.

The beverage brewing apparatus of the subject invention further comprises a dispensing assembly which is operatively associated with the heating chamber and which includes a valve member supported adjacent the outlet port of the heating chamber, and a thermally deformable actuating member or piston disposed at least partially within the heating chamber. The actuating member is operatively connected to the valve member and is adapted and configured to move the valve member from a closed position to an open position when water contained within the heating chamber is heated to a predetermined temperature, causing the actuating member to undergo expansion through thermal deformation. Preferably, the actuating member is formed of a thermally deformable elastomeric material, such as, for example, silicone rubber, and is disposed within a thermally conductive guide tube supported within the heating chamber.

In a preferred embodiment of the subject invention, the beverage brewing apparatus also includes a valve return spring configured to move the valve member from an open position to a closed position when the actuating member contracts through thermal deformation. Preferably, a calibrating mechanism is associated with the actuating member and valve member to selectively control the axial movement of the actuating member, and thereby control the temperature at which the valve member is opened. Thus, the strength and quality of the brewed coffee may be selectively varied. The beverage brewing apparatus also includes a thermostat which is disposed adjacent the heating element and which is provided to disrupt the heating element when the water heating chamber reaches a predetermined temperature in the absence of water, thereby preventing any damage to the apparatus.

Further features of the beverage brewing apparatus of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to construct and use the coffee making apparatus described herein, preferred embodiments thereof will be described in detail hereinbelow with reference to the drawings wherein:

FIG. 4 is an enlarged side elevational view in partial cross-section of a portion of the coffee making apparatus as shown in FIG. 3 illustrating the valve member of the dispensing assembly in an open position as heated water is dispensed from the heating chamber of the brewing assembly into a brewing basket containing ground coffee;

FIG. 5 is an enlarged side elevational view in partial cross-section of a portion of the coffee making apparatus as shown in FIGS. 3 and 4 illustrating the valve member of the dispensing assembly in a closed position as cool water flows into the heating chamber of the brewing assembly from the water reservoir;

DETAILED DESCRIPTION OF THE PREFERRED EMBODIMENTS

Figure 1:
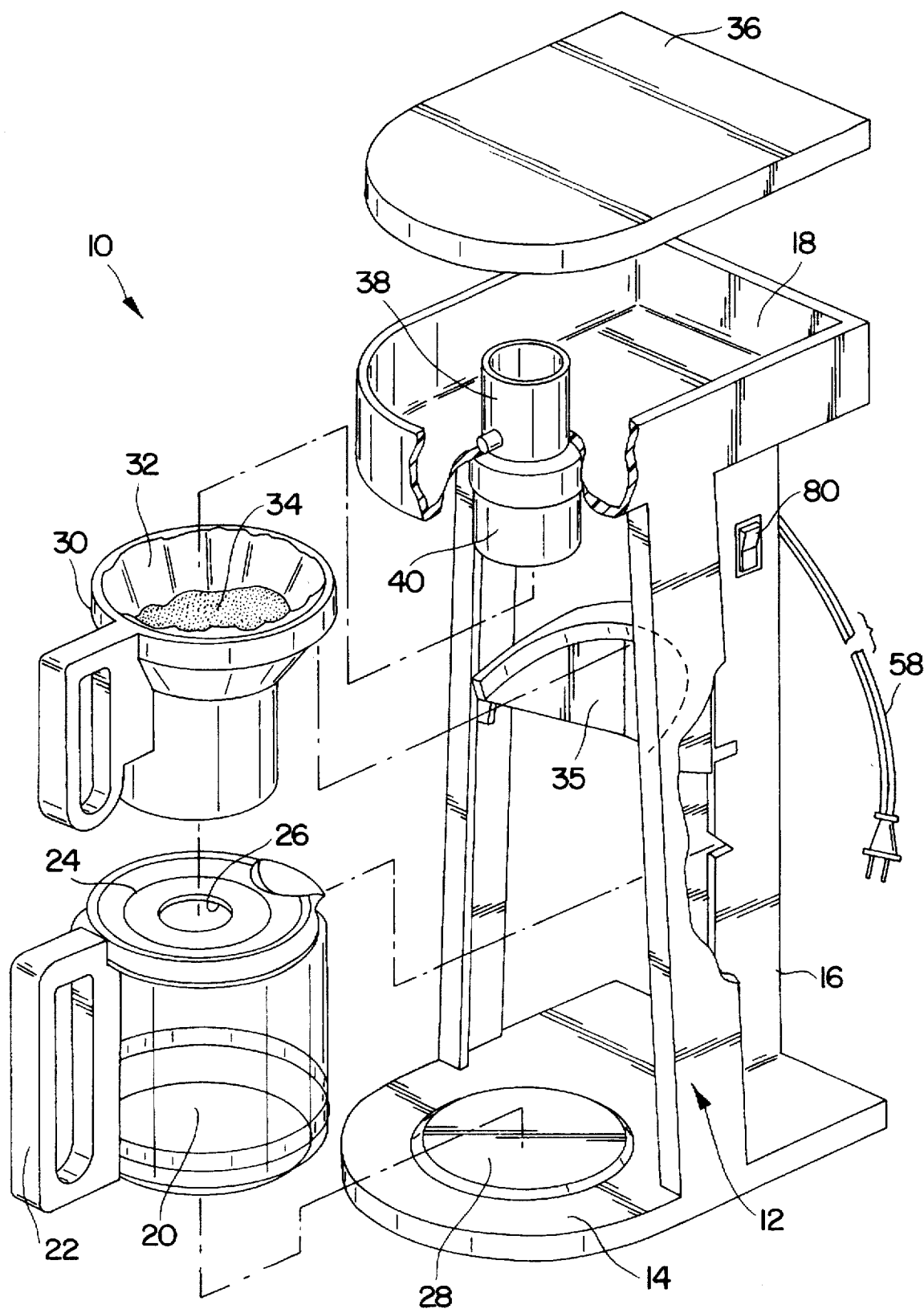
FIG. 1 is a perspective view of a coffee making apparatus constructed in accordance with a preferred embodiment of the subject invention with the component parts thereof separated for ease of illustration.

Referring now in detail to the drawings wherein like reference numerals identify similar structural elements of the subject invention, there is illustrated in FIG. 1 a beverage brewing apparatus constructed in accordance with a preferred embodiment of the subject invention and designated generally by reference numeral 10. In brief, the beverage brewing apparatus 10 of the subject invention is an automatic drip coffee maker having a unique valve mechanism which is adapted and configured to dispense heated water from a water heating chamber into a brewing basket containing ground coffee only when the heated water reaches a predetermined temperature within the heating chamber.

Referring now to FIG. 1, beverage brewing apparatus 10 includes a support structure or housing 12 defined by a substantially planar base portion 14, an upstanding body portion 16 extending from the planar base portion, and a water reservoir 18 depending from the upstanding body portion. The base portion 14, body portion 16 and water reservoir 18 are all constructed from a thermoplastic material, such as, for example, a polypropylene or polycarbonate material.

The base portion 14 of housing 12 is dimensioned and configured to receive and support a conventional blown glass coffee carafe 20. As is common with many of today's automatic drip coffee makers, carafe 20 includes a thermoplastic handle 22 and a radially inwardly tapered thermoplastic lid or cover 24 having a centrally located aperture 26 formed therein for receiving brewed coffee. A metal heat transfer plate 28 is embedded within the upper surface of base portion 14 for maintaining the contents of coffee carafe 20 at a palatable temperature during use. If, however, an insulated coffee carafe is utilized, the need for the heating plate would be obviated.

The body portion 16 of housing 12 is dimensioned and configured to receive a conventional brewing basket 30 which is adapted and configured to support a filter 32 and ground coffee 34. A contoured shelf 35 is disposed between the upstanding walls of body portion 16 for supporting the brewing basket 30 above the coffee carafe 20. The configuration of shelf 35 can vary from that which is illustrated in FIG. 1 depending upon the configuration of brewing basket 30, and may be designed to support only the rim of the brewing basket. Reservoir 18 defines a container for holding a quantity of cool water suitable for heating, and includes a removable cover 36 for enclosing the water reservoir. Disposed within reservoir 18, is a water heating assembly 38 and an adjacent hot water dispensing assembly 40, both of which are discussed in greater detail hereinbelow.

Figure 3:
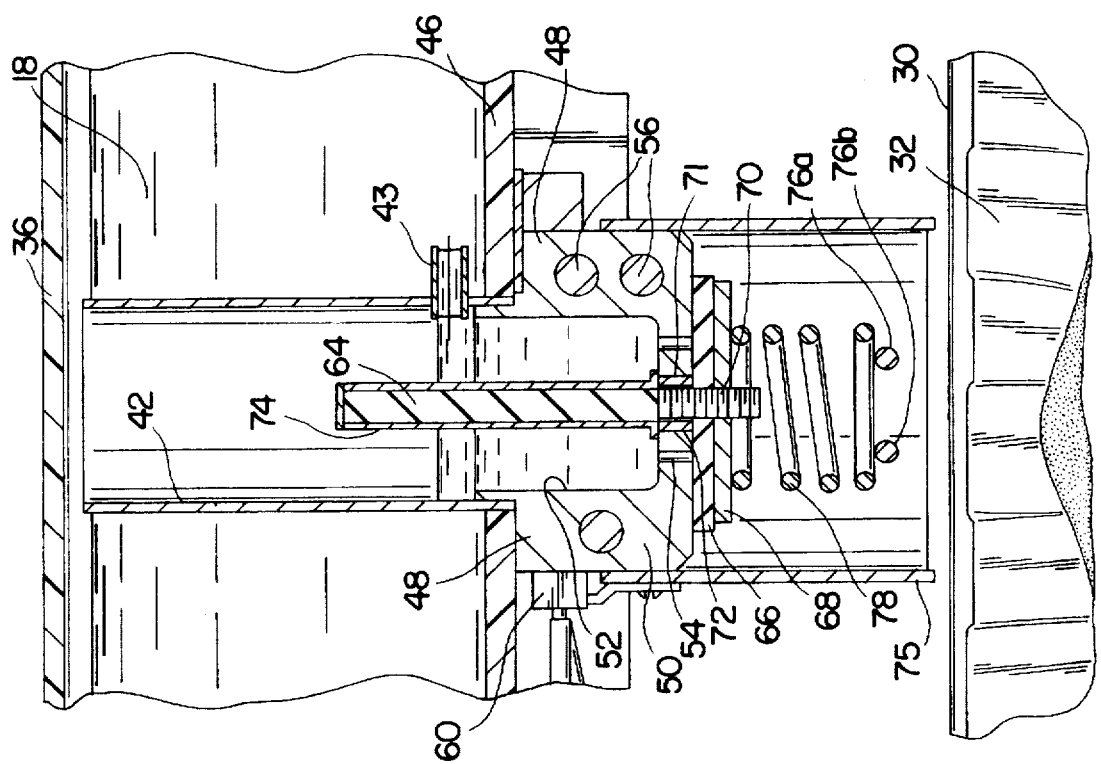
FIG. 3 is an enlarged side elevational view in partial cross-section of a portion of the coffee making apparatus of FIG. 1 illustrating the valve member of the dispensing assembly in a closed position and the heating chamber of the brewing assembly partially filled with water.
Figure 2:
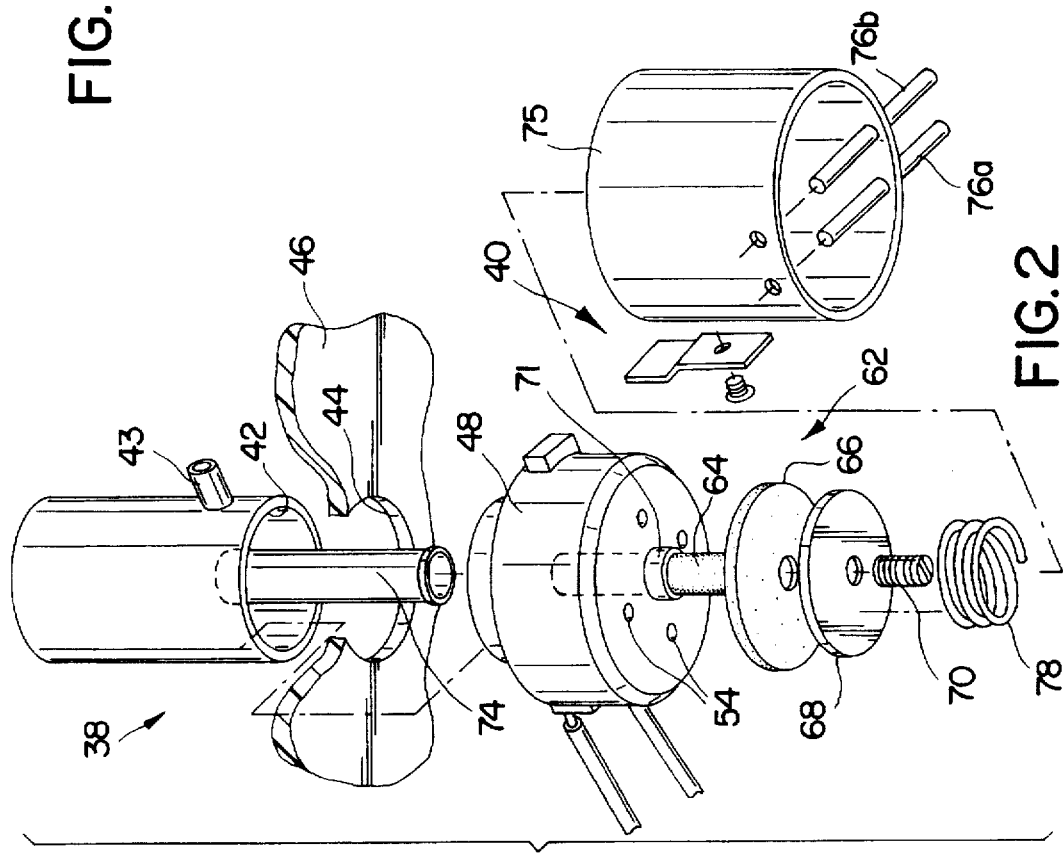
FIG. 2 is an exploded perspective view of the dispensing assembly of the coffee making apparatus of FIG. 1 illustrating several component parts of a preferred embodiment of the dispensing assembly.

Referring now to FIG. 2, water heating assembly 38 includes a cylindrical water heating chamber 42 formed of a heat resistant material and having an inlet sleeve 43 for receiving water from reservoir 18. Heating chamber 42 is disposed adjacent an aperture 44 which extends through the bottom wall 46 of reservoir 18. A low wattage electrically powered water heater 48 is mounted beneath bottom wall 46 and is in thermal contact with a portion of water heating chamber 42. As illustrated in FIG. 3, water heater 48 consists of a generally cylindrical casting 50 formed of a heat conductive material which has a generally cylindrical trough 52 formed therein for receiving a quantity of water from reservoir 18 during a brewing cycle. A series of spaced apart outlet ports 54 extend through a bottom portion of water heater 48 from trough 52, and a tubular heating coil 56 is embedded within the casting and substantially surrounds the trough.

Heating coil 56 is electrically connected to the main electrical power cord 58 shown in FIG. 1, and is controlled by a thermostat 60. The thermostat is configured to open and close in dependence upon changes in the temperature of the heating coil, and can be calibrated to shut the water heater off when it attains a predetermined temperature, i.e., at the conclusion of a brewing cycle when there is no longer any water in the heating chamber to be heated. Suitable temperature control thermostats are well known in the art and are readily available to the skilled artisan. In addition to the thermostat, a thermal fuse may be associated with the water heater circuitry, to shut the water heater off if the thermostat should fail to operate properly. Similar safety mechanism may also be associated with heating plate 28.

With continuing reference to FIG. 2, the hot water dispensing assembly 38 of beverage brewing apparatus 10 includes a valve mechanism 62 which serves to control the flow of heated water from the plural outlet ports 54 of water heater 48. Valve mechanism 62 includes an elongated actuating member 64, an upper valve disc 66, which serves as a fluid seal with respect to outlet ports 54, and a lower valve disc 68, which serves to support the upper valve disc 66. Actuating member 64 and valve disc 66 are formed from an elastomeric material, such as, for example, silicone rubber, while the lower valve disc 68 is formed of a more rigid non-compliant material, such for example, a durable light weight metallic material.

The upper valve disc 66 is operatively connected to a short threaded rod 70 through a centrally located threaded aperture formed therein and is disposed in face-to-face contact with the lower valve disc 68. The upper end of threaded rod 70 is positioned to operatively contact the bottom end of actuating member 64, and together, the two elongated structures act as a piston during a brewing cycle to move the two valve discs relative to the bottom surface of the water heater, so as to effectively control the flow of hot water therefrom. In addition, as will be discussed in greater detail hereinbelow, threaded rod 70 may be utilized to calibrate the temperature at which hot water is dispensed from the water heating assembly, and thereby control the strength and quality of the brewed coffee.

As illustrated in FIG. 2, the elongated actuating member 64 extends through a guide sleeve or bushing 71 disposed within a central bore 72 defined in the lower portion of water heater 48, and rises upwardly within trough 52 into water heating chamber 42. Actuating member 64 is enclosed within a conducting tube 74 which is preferably formed from aluminum, or a similar heat conducting material, and which functions to allow the elastomeric actuating member 64 to adequately sense the temperature of the heated water within the water heating assembly. Bushing 71 serves to thermally isolate heating chamber 42 from conducting tube 74 and actuating member 64. In doing so, actuating member 64 will only sense the temperature of the heated water, not the temperature of the water heater.

A cylindrical shroud 75 surrounds the water dispensing assembly 40 and is securely mounted to water heater 48 by conventional threaded fasteners. Shroud 75 may be positioned within a thermoplastic housing which would act to isolate water and steam from electrically live components. In addition, two spaced apart diametrically extending struts 76a and 76b are disposed within shroud 75, adjacent a lower end thereof, for supporting a coiled compression spring 78 which serves to bias valve mechanism 62 in an upward direction, into a closed position with respect to the bottom surface of water heater 48. As illustrated in FIG. 3, compression spring 78 bears against the bottom surface of lower valve disc 68 to maintain the valve mechanism in a closed position.

As discussed hereinabove, the elongated actuating member 64 of valve mechanism 62 is formed from an elastomeric material, such as, for example, a silicone rubber. Silicone elastomers, such as silicone rubber, can be compounded in various ways to achieve desirable physical characteristics, and at elevated temperatures, they are extremely stable and have a high rate of thermal expansion. Thus, in the case of the elongated actuating member 64, when it is subjected to elevated temperatures within water heating chamber 42 and trough 52 during a brewing cycle, it will undergo thermal deformation or expansion within conducting tube 74. Consequently, actuating member 64 will elongate beyond its normal axial dimensions, and will thereby urge threaded rod 70 and valve discs 66 and 68 in a downward direction against the bias of compression spring 78. As a result, the upper valve disc 66 will move away from the bottom surface of water heater 48, whereby the outlet ports 54 will become unobstructed so that heated water may flow therefrom.

As discussed briefly hereinabove, valve mechanism 62 may be calibrated to dispense hot water within a particular temperature range, so as to vary the quality and/or strength of the brewed coffee. Calibration of the valve mechanism is accomplished by selectively adjusting the axial position of threaded rod 70 relative to the bottom end of actuating member 64 within conducting tube 74. For example, if the threaded rod 70 is positioned so that there is a gap between the top end thereof and the bottom end of actuating member 64, relatively high heat will be required to cause the actuating member 64 to elongate a sufficient distance to contact the top end of threaded rod 70, and thus move the threaded rod 70 and the upper valve disc 66 away from the bottom surface of water heater 48 to expose outlet ports 54. As a result, the temperature of the hot water dispensed from the water heater will be relatively high.

Conversely, if under ambient temperature conditions, the top end of threaded rod 70 is in direct contact with the bottom end of actuating member 64, relatively less heat will be required to cause the actuating member 64 to move the upper valve disc 66 away from the bottom surface of water heater 48. As a result the temperature of the hot water dispensed from the water heater will be relatively low. It has been found that by adjusting threaded rod 70 in this manner, the dispensing temperature of the heated water can be adjusted within a range of approximately 10° to 15° degrees. Those skilled in the art will readily appreciate that the threaded rod may be adjusted by manually turning the rod. However, it is envisioned that a lever may be provided which would extend radially outward from the threaded rod to facilitate the manual rotation thereof.

Referring now in sequential order to FIGS. 3 through 5, initially, when water is introduced into reservoir 18, it will flow through inlet sleeve 43 and into heating chamber 42 and trough 52 until sufficient head pressure develops within the heating chamber to achieve fluid equilibrium between the reservoir and the heating chamber. At such a time, actuating member 64 is in its normal dimensional state enclosed within conducting tube 74. Consequently, valve plates 66 and 68 are in a closed position biased upwardly by compression spring 78. Thereupon, the water heater 48 may be activated by manipulating the power control toggle switch 80 shown in FIG. 1. Concomitant with the water heater being activated, the heating plate 28 embedded within the base portion 14 of housing 12 is also activated. Over a period of time, the water within heating chamber 42 and trough 52 increases in temperature, causing actuating member 64 to expand through thermal deformation, thereby increasing in axial length.

As illustrated in FIG. 4, when actuating member 64 elongates it acts as a piston, forcing threaded rod 70 and valve discs 66 and 68 in a downward direction against the bias of compression spring 78. As the upper valve disc 66 moves away from the bottom surface of water heater 48, hot water begins to flow from outlet ports 54, over and around the valve plates, and into the brewing basket 30 containing a quantity of ground coffee 34 for brewing. As hot water is dispensed from the water heater, cylindrical shroud 75 acts as a guard to prevent hot water from splashing outwardly from the dispensing area.

As best seen in FIG. 5, once a sufficient quantity of hot water has egressed from water heating chamber 42, so as to sufficiently relieve the head pressure acting against the ingress of cooler water from reservoir 18, such cooler water begins to enter the water heating assembly 40 through inlet sleeve 43. At such a time, the cooler water causes the elastomeric material from which actuating member 64 is formed, to undergo contractive deformation. Consequently, actuating member 64 decreases in axial length. As a result, compression spring 78 relaxes to its normally decompressed state, urging valve mechanism 62 into a closed position, whereupon the upper valve disc 66 is in face-to-face contact with the bottom surface of water heater 48 so that outlet ports 54 are once again obstructed. This sequence of events will continue until all of the water in reservoir 18 has passed into water heating assembly 38 and out through dispensing assembly 40. Thereupon, thermostat 60 will shut off the water heater. However, the brewed coffee within carafe 20 will be maintained at a palatable temperature by heating plate 28.

Figure 7:
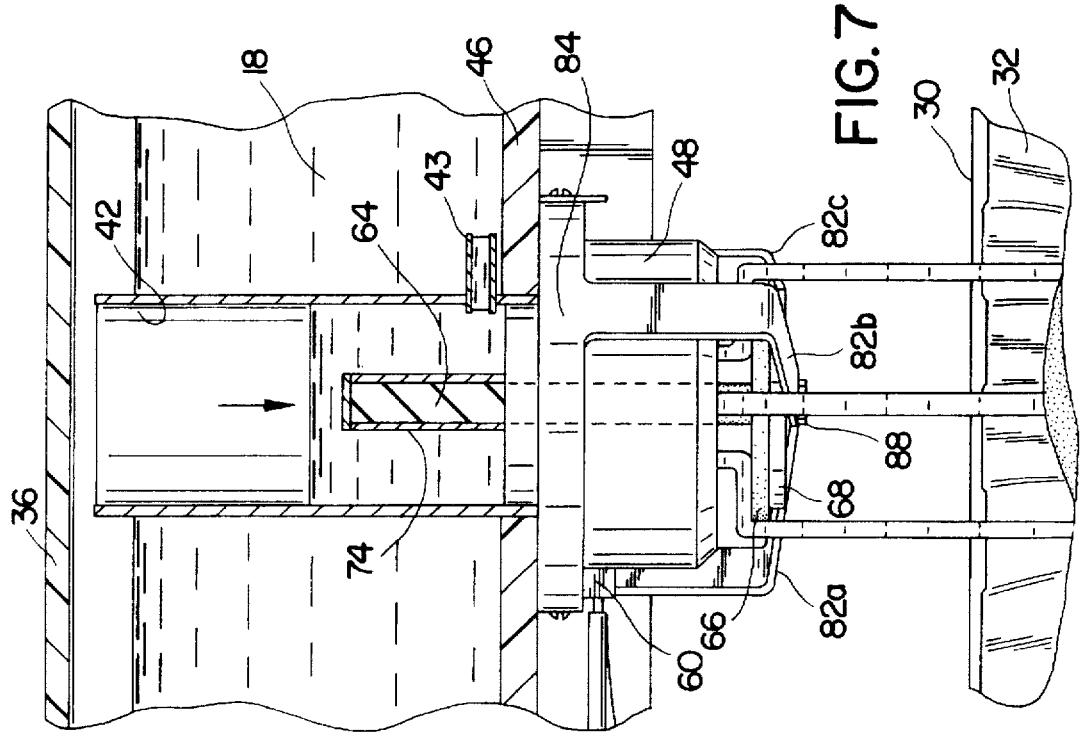
FIG. 7 is an enlarged side elevational view in partial cross-section of a portion of the coffee making apparatus of the subject invention, similar to the illustration of FIG. 3, depicting the valve member of the dispensing assembly of FIG. 6 in an open position as heated water is dispensed from the heating chamber of the brewing assembly into a brewing basket containing ground coffee.
Figure 6:
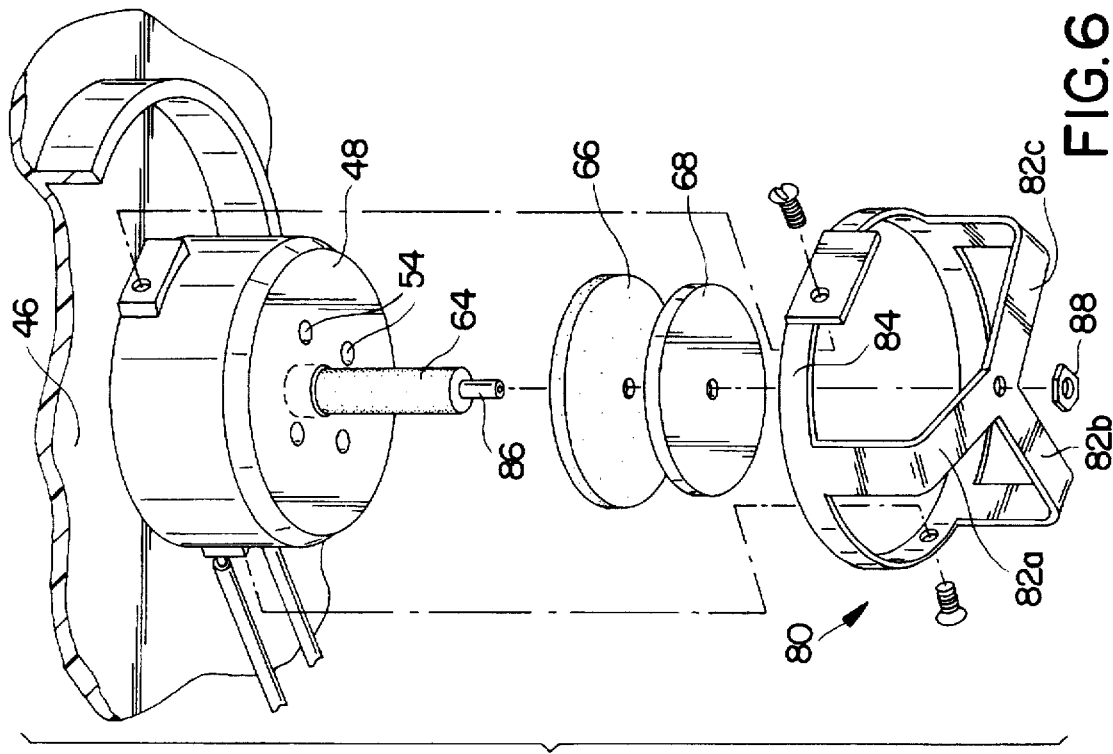
FIG. 6 is an exploded perspective view of another preferred embodiment of the dispensing assembly of the coffee making apparatus of the subject invention.

Referring now to FIGS. 6 and 7, there is illustrated another water dispensing assembly constructed in accordance with a preferred embodiment of the subject invention, which, instead of employing a coiled compression spring to bias the valve mechanism into a closed position, as in the embodiment of FIG. 2, employs a leaf spring component 80 to bias the valve mechanism into a closed position. Spring component 80 includes three interconnected spring arms 82a–82c depending from an annular hoop 84 which is secured to the exterior water heater 48 by conventional threaded fasteners. A threaded fastener 86, which depends from the bottom end of the elastomeric actuating member 64, extends through the central apertures formed in the upper and lower valve discs 66 and 68, and is secured to spring component 80 at the junction of spring arms 82a–82c by a conventional threaded nut 88.

Similar in function to compression spring 78, spring arms 82a–82c function to maintain the valve assembly in a normally closed position, and also function to urge the valve assembly into a closed position when actuating member 64 contracts as it is cooled by water from the reservoir during a brewing cycle. Threaded fastener 86 and threaded nut 88 serve as a calibrating mechanism, similar to the threaded rod 70 shown in FIG. 2, to selectively control the temperature at which heated water is dispensed from water heater 48 by the valve assembly, and thus the quality of the brewed coffee. More particularly, when the position of threaded fastener 86 is selectively adjusted with respect to threaded nut 88, the axial distance the actuating member 64 must elongate to move upper valve disc 66 to an open position will vary accordingly, thereby influencing the temperature at which hot water is dispensed into the brewing basket.

Although the coffee making apparatus of the subject invention have been described with respect to a preferred embodiment, it is apparent that modifications and changes can be made thereto without departing from the spirit and scope of the invention as defined by the appended claims.

What is claimed is:

1. A beverage brewing apparatus comprising a housing including a lower base portion for supporting a carafe having a brewing basket associated therewith and an upper body portion defining a water reservoir; a brewing assembly operatively associated with said upper body portion and including a heating chamber having an inlet port communicating with said water reservoir and an outlet port through which heated water is dispensed, and a heating element in thermal contact with said heating chamber; a dispensing assembly operatively associated with said heating chamber including a valve member supported adjacent the outlet port of said heating chamber, a thermally deformable actuating member disposed at least partially within said heating chamber and operatively connected to said valve member for moving said valve member from a closed position to an open position when water contained within said heating chamber is heated to a predetermined temperature; and calibrating means for selectively controlling the movement of said valve member.

2. A beverage brewing apparatus as defined in claim 1 wherein said calibrating means includes a threaded control mechanism operatively associated with said valve member and a lower end of said actuating member.

3. A beverage brewing apparatus comprising a housing including a lower base portion for supporting a carafe having a brewing basket associated therewith and an upper body portion defining a water reservoir; a brewing assembly operatively associated with said upper body portion and including a heating chamber having an inlet port communicating with said water reservoir and an outlet port through which heated water is dispensed, and a heating element in thermal contact with said heating chamber; a dispensing assembly operatively associated with said heating chamber including a valve member supported adjacent the outlet port of said heating chamber, a thermally deformable silicone rubber actuating member disposed at least partially within said heating chamber and operatively connected to said valve member for moving said valve member from a closed position to an open position when water contained within said heating chamber is heated to a predetermined temperature.

4. A beverage brewing apparatus comprising a housing including a lower base portion for supporting a carafe having a brewing basket associated therewith and an upper body portion defining a water reservoir; a brewing assembly operatively associated with said upper body portion and including a heating chamber having an inlet port communicating with said water reservoir and an outlet port through which heated water is dispensed, and a heating element in thermal contact with said heating chamber; a dispensing assembly operatively associated with said heating chamber including a valve member supported adjacent the outlet port of said heating chamber, an elongated actuating member formed from a thermally deformable elastomeric material disposed at least partially within said heating chamber and operatively connected to said valve member for moving said valve member from a closed position to an open position when water contained within said heating chamber is heated to a predetermined temperature causing said actuating member to expand through thermal deformation; and a calibrating mechanism operatively associated with a lower end of said actuating member to selective control the axial movement of said actuating member and thereby control the temperature at which said valve member moves to an open position.

5. A beverage brewing apparatus comprising a housing including a lower base portion for supporting a carafe having a brewing basket associated therewith and an upper body portion defining a water reservoir; a brewing assembly operatively associated with said upper body portion and including a heating chamber having an inlet port communicating with said water reservoir and an outlet port through which heated water is dispensed, and a heating element in thermal contact with said heating chamber; a dispensing assembly operatively associated with said heating chamber including a valve member supported adjacent the outlet port of said heating chamber, an elongated actuating member formed from silicone rubber disposed at least partially within said heating chamber and operatively connected to said valve member for moving said valve member from a closed position to an open position when water contained within said heating chamber is heated to a predetermined temperature causing said actuating member to expand through thermal deformation.

6. A beverage brewing apparatus comprising a housing having a base portion, an upstanding body portion and a water reservoir, the reservoir having a wall with an aperture, a water heating chamber positioned in the aperture and extending from the wall into the reservoir, a water heater in thermal contact with the water heating chamber, means for flow of water from the reservoir to establish a body of water in the water heating chamber, outlet means for draining the body of water from the water heating chamber, a valve member for closing the outlet means, a heat conducting tube located in the water heating chamber, and a thermally deformable elastomeric actuating member located in the heat conducting tube for opening the valve and draining the body of heated water from the chamber to brew a beverage.

7. A beverage brewing apparatus as defined in claim 6 further comprising valve return means for moving said valve member from an open position to a closed position.

8. A beverage brewing apparatus as defined in claim 7 wherein said valve return means comprises a compression spring.

9. A beverage brewing apparatus as defined in claim 6 further comprising temperature control means for disrupting the heating element when said heating chamber reaches a predetermined temperature.

10. A beverage brewing apparatus as defined in claim 9 wherein said temperature control means includes a thermostat operatively associated with said heating element.

11. A beverage brewing apparatus as defined in claim 6 further comprising warming means for maintaining the contents of a carafe supported on said base portion at a desired temperature.

12. A beverage brewing apparatus as defined in claim 11 wherein said warming means includes a heat transfer plate mounted said base portion.

13. A beverage brewing apparatus as defined in claim 6 in which the means for flow of water comprises a conduit sleeve extending between said reservoir and said heating chamber.

14. A beverage brewing apparatus comprising a housing having a base portion, an upstanding body portion and a water reservoir, a water heating chamber, a water heater in thermal contact with the water heating chamber, means for flow of water from the reservoir to establish a body of water in the water heating chamber, outlet means for draining the body of water from the water heating chamber, a valve member for closing the outlet means, a heat sensitive member located in the water heating chamber for actuating the valve member, and means for adjusting the position of the valve with respect to the actuating member thereby to adjust the temperature of heated water drained from the water heating chamber to brew a beverage.

15. A beverage brewing apparatus as defined in claim 14 further comprising a valve return spring disposed adjacent said valve member to move said valve member from an open position to a closed position when said heat sensitive member contracts through thermal deformation.

16. A beverage brewing apparatus as defined in claim 14 further comprising a thermostat operatively associated with said heating element to disrupt said heating element when said heating chamber reaches a predetermined temperature in the absence of water.

17. A beverage brewing apparatus as defined in claim 14 wherein said heat sensitive member is an elastomer.

18. A beverage brewing apparatus as defined in claim 17 wherein said heat sensitive elastomer is silicone rubber.

19. A beverage brewing apparatus comprising a housing having a base portion, an upstanding body portion and a water reservoir having a bottom wall, an aperture in the bottom wall, a water heating chamber disposed adjacent the aperture and extending into the reservoir, a water heater in thermal contact with the water heating chamber, a water receiving trough in the water heater, means for flow of water from the reservoir to establish a body of water in the water heating chamber and in the water heater trough, outlet means for draining the body of heated water from the water heating chamber and trough, a valve for closing the outlet means, a heat sensitive elastomeric actuating member positioned on the water heater and extending into the body of water in the trough and chamber for opening the valve and draining the body of heated water from the chamber and trough to brew coffee, and means for closing the valve after the water is drained.

20. A beverage brewing apparatus comprising a housing having a base portion, an upstanding body portion and a water reservoir having a bottom wall, an aperture in the bottom wall, a water heating chamber disposed adjacent the aperture and extending into the reservoir, a water heater disposed adjacent the aperture and extending below the bottom wall and being in thermal contact with the water heating chamber, a water receiving trough in the water heater communicating with the water heating chamber, means for flow of water from the reservoir to establish a body of water in the water heating chamber and in the water heater trough, the water heater having outlet means for draining the body of water from the chamber and trough, a valve for closing the outlet means, a heat conducting tube mounted on the water heater and extending into the water heating chamber and trough, a heat sensitive elastomeric actuating member located in the heat conducting tube for opening the valve when the body of water is heated and for draining the body of heated water from the chamber to brew coffee, and means for closing the valve after the water is drained.

21. A water heating and dispensing assembly for a coffee brewing apparatus, the assembly comprising a tubular water heating chamber with opposed ends, a water heater fitted in thermal contact to one end of the chamber, the water heater having a trough, the trough having a base and an open end communicating with the water heating chamber and together with the water heating chamber defining space for receiving a body of water, means for admitting water into the space, outlet means in the base of the trough for draining the chamber and trough, a valve for opening and closing the outlet means, a heat conducting tube fitted to the base of the trough and extending through the trough space into the water heating chamber, the heat conducting tube having a closed top and an open bottom at the base of the trough, an elongate heat sensitive elastomeric actuating member positioned within the heat conducting tube for opening the valve when the body of water has been heated, and means for closing the valve.

22. A water heating and dispensing assembly for a coffee brewing apparatus, the assembly comprising a tubular water heating chamber with opposed ends, a water heater fitted in thermal contact to one end of the chamber, the water heater having a trough, the trough having a base and an open end communicating with the water heating chamber and together with the water heating chamber defining space for receiving a body of water, means for admitting water into the space, outlet means in the base of the trough for draining the chamber and trough, a valve for opening and closing the outlet means, a heat conducting tube fitted to the base of the trough and extending through the trough space into the water heating chamber, the guide sleeve having a closed top and an open bottom at the base of the trough, a heat sensitive actuating member positioned within the heat conducting tube for opening the valve when the body of water has been heated, means for adjusting the position of the valve with respect to the actuating member thereby to adjust the temperature of heated water drained from the water heating chamber to brew a beverage, and means for closing the valve.

23. A beverage brewing apparatus comprising a housing having a base portion, an upstanding body portion and a water reservoir, the reservoir having a wall with an aperture, a water heating chamber positioned in the aperture and extending from the wall into the reservoir, a water heater in thermal contact with the water heating chamber, the water heater having a trough extending above a base in the trough with the trough communicating with the water heating chamber, means for flow of water from the reservoir to establish a body of water in the water heating chamber and trough, outlet means in the base of the water heater for draining the body of water from the water heating chamber and trough, a valve for closing the outlet means, a heat conducting tube fitted to the base of the trough and extending through the trough into the water heating chamber, the heat conducting tube having a closed top and an open bottom at the base of the trough, a heat sensitive elastomeric actuating member positioned within the guide sleeve for opening the valve when the body of water has been heated, and means for closing the valve.

24. A beverage brewing apparatus comprising a housing having a base portion, an upstanding body portion and a water reservoir having a bottom wall with an aperture therein, a cylindrical water chamber fitted to the aperture, the water chamber having open upper and lower ends, a water heater in thermal contact with the lower end of the water chamber, the water heater having a bottom portion and a trough, the trough together with the water chamber defining a water heating space, means for admitting water from the reservoir to the water heating space, port means in the bottom portion of the water heater for discharging water from the water heating space, a valve for opening and closing the port means, a heat conducting tube mounted on the water heater and extending into the in the water heating space, a heat sensitive actuating member located in the heat conducting tube for opening the valve when the body of water is heated and for draining the body of heated water from the chamber to brew coffee, means for adjusting the position of the valve with respect to the actuating member thereby to adjust the temperature of heated water drained from the water heating chamber to brew a beverage, and means for closing the valve after the water is drained.

* * * * *